(12) United States Patent
Raymond

(10) Patent No.: US 9,309,929 B2
(45) Date of Patent: Apr. 12, 2016

(54) DRIVE SHAFT ADAPTOR AND COUPLING

(71) Applicant: Steve L. Raymond, Clarkston, MI (US)

(72) Inventor: Steve L. Raymond, Clarkston, MI (US)

(73) Assignee: Micro-Poise Measurement Systems, LLC, Streetsboro, OH (US)

( * ) Notice: Subject to any disclaimer, the term of this patent is extended or adjusted under 35 U.S.C. 154(b) by 0 days.

(21) Appl. No.: 13/874,871

(22) Filed: May 1, 2013

(65) Prior Publication Data

US 2013/0294822 A1 Nov. 7, 2013

Related U.S. Application Data

(60) Provisional application No. 61/640,865, filed on May 1, 2012.

(51) Int. Cl.
*F16D 1/06* (2006.01)
*F16D 3/50* (2006.01)

(52) U.S. Cl.
CPC .. *F16D 3/50* (2013.01); *F16D 1/06* (2013.01); *Y10T 29/49947* (2015.01); *Y10T 403/645* (2015.01)

(58) Field of Classification Search
CPC .... F16D 2001/062; F16D 1/033; F16D 1/076
USPC .......... 403/335, 336, 337, 1, 27; 464/182, 23, 464/135
See application file for complete search history.

(56) References Cited

U.S. PATENT DOCUMENTS

| | | | | | |
|---|---|---|---|---|---|
| 2,803,474 | A | * | 8/1957 | Wilson | 403/336 |
| 3,088,763 | A | * | 5/1963 | Foltz | 403/192 |
| 5,123,772 | A | * | 6/1992 | Anderson | 403/374.4 |
| 5,401,062 | A | * | 3/1995 | Vowles | 285/12 |
| 5,826,464 | A | * | 10/1998 | Tsunoda et al. | 74/572.21 |
| 6,131,850 | A | * | 10/2000 | Hey et al. | 244/54 |
| 6,893,349 | B2 | * | 5/2005 | Krugman et al. | 464/23 |
| 7,213,999 | B2 | * | 5/2007 | Haas | 403/337 |
| 8,187,105 | B2 | * | 5/2012 | Jaworowicz et al. | 464/33 |
| 2010/0190560 | A1 | * | 7/2010 | Jaworowicz et al. | 464/150 |
| 2012/0275851 | A1 | * | 11/2012 | Aarre | 403/314 |

FOREIGN PATENT DOCUMENTS

JP 06227274 A * 8/1994 .............. 464/180

* cited by examiner

*Primary Examiner* — Daniel P Stodola
*Assistant Examiner* — Matthieu Setliff
(74) *Attorney, Agent, or Firm* — Tarolli, Sundheim, Covell & Tummino LLP

(57) ABSTRACT

An apparatus and method for connecting a drive shaft end to a vehicle drive flange of the type that has six equally spaced, axially directed threaded bores. The apparatus includes a yoke member defining a pair of ears for receiving pin members defined by the drive shaft. The yoke member has at least four equally spaced apart axial through bores that are alignable with four of the bores in the drive flange. Fasteners extending through the through bores are threadably received by the aligned drive flange bores and clamp the yoke member to the drive flange. At least one, but preferably two, drive pins are threadably received by two of the six drive flange bores and include portions that are received by associated bores in the yoke member and are preferably sized to tightly fit the bores in a torque transmitting relationship.

8 Claims, 4 Drawing Sheets

DRIVE SHAFT ADAPTOR AND COUPLING

RELATED APPLICATION

This application claims the benefit of U.S. Provisional Patent Application Ser. No. 61/640,865, filed on May 1, 2012, the disclosure of which is entirely incorporated herein by reference.

TECHNICAL FIELD

The present invention relates generally to vehicle power trains and, in particular, to a coupling system for coupling a drive shaft having a conventional universal joint to a drive train flange that is not intended to receive a conventional universal joint.

BACKGROUND ART

Certain vehicles, such as the current Ford Mustang, are shipped from the factory with a drive shaft that includes at least one end that is directly bolted to an input flange forming part of either the output of the transmission or the input to the rear axle/differential. In particular, certain Ford Mustang models are delivered by the factory with a two-piece draft shaft, where the pieces of the drive shafts are interconnected by a constant velocity (CV) joint which is operative to accommodate the required relative vertical and lateral movement between the output of the transmission and the rear axle that occurs as the rear axle moves relative to the vehicle body. In the factory design, the output end of the two-piece drive shaft is directly coupled to a six bolt flange that is attached to and drives the differential pinion shaft.

It has been found that current owners and prospective owners of these types of vehicles desire to increase the power output of the engine. It has also been found that when the power output is increased, the drive shaft must be strengthened in order to accommodate the increased torque transmitted through the drive shaft: In addition, the one-piece drive-shaft offers 20 lbs. less rotating mass As a result of this market demand, after market suppliers are now offering single-piece drive shafts to replace the factory supplied two-piece drive shaft. These single piece drive shafts typically include a spicer-type universal joint and flange yoke for connecting the output end of the drive shaft to the rear axle. In order to mate the drive shaft to the rear axle flange, suppliers have created adaptors that are bolted to the CV flange and which also include four threaded bores for receiving fasteners that secure a spicer-type flange yoke to the flange. It has been found that the use of an adaptor adds cost and increased probability of imbalance to this drive shaft modification. The strength of the joint between the output end of the drive shaft and the rear axle flange may also be compromised since only four bolts are used to secure the end of the drive shaft to the rear axle flange.

SUMMARY OF INVENTION

The present invention provides a new and improved method and apparatus for attaching a drive shaft having a conventional spicer-type universal joint to a six bolt drive flange that forms part of the rear axle of certain model vehicles.

In the preferred and illustrated embodiment, the apparatus includes a yoke member defining a pair of ears for receiving axially aligned pin members defined by the drive shaft end. The yoke member has at least four spaced apart, axial through bores which are alignable with four threaded bores defined by the drive flange. The yoke member is attached to the drive flange by fasteners which extend through the yoke member through bores and are threadedly received by the aligned bores of the drive flange. At least one pin member is threadedly received by one of the drive flange bores (other than the four bores which receive the fasteners that attach the yoke member). The yoke member defines a torque transfer bore that is adapted to receive an exposed portion of the drive pin when the yoke member is attached to the drive flange. With the present construction, torque is transferred between the drive shaft and the drive flange via the four fasteners that attach the yoke member to the drive flange, as well as the pin member. Preferably, the drive pin portion and the associated torque transfer bore are sized such that the drive pin portion is received by the bore in a tight fitting, torque transmitting relationship.

In a more preferred embodiment, the apparatus includes an additional torque transmitting pin threadedly received by another drive flange bore. The yoke member includes an additional torque transmitting bore for receiving a portion of the additional drive pin. The drive pin portions extends axially beyond their associated drive flange bores and extend into the associated bores defined by the yoke member.

In the preferred and illustrated embodiment, the yoke member forms part of a universal joint for attaching the end of the drive shaft to the drive flange. In the illustrated embodiment, the pin members pivotally received by the yoke years form part of a cross piece which define two orthogonal pivot axes, whereby a universal joint is defined for attaching the end of the drive shaft to the yoke member.

According to the preferred and illustrated method, an end of a drive shaft is attached to a drive flange having at least five axially directed threaded bores by forming a yoke member that defines a pair of ears for receiving axially aligned pin members defined by the drive shaft. Four spaced apart axial through bores are formed in the yoke member which are alignable with four of the threaded drive flange bores. The yoke member is attached to the drive flange using fasteners that extend through the axial through bores formed in the yoke member and threadedly engage four of the threaded drive flange bores. The method further comprises the step of installing a drive pin into a drive flange bore that is not aligned with the axial through bores of the yoke member. A bore is formed or machined into the yoke member for receiving a portion of the drive pin whereby torque is transmitted between the drive flange and the yoke member. In a more preferred method for use with a drive flange having six spaced apart threaded bores, an additional drive pin is installed into the sixth bore and the yoke member is formed with an additional bore for receiving the additional drive pin.

It should be noted here that the present invention is especially adapted to attach a drive shaft end to a drive flange having six spaced apart axially directed threaded bores. The invention, however, can be adapted for use in attaching a drive shaft end to a drive flange having more or less than six bores. In fact, this invention can be used with a drive flange having only five bores in which four are used to attach the yoke member to the drive flange and the fifth threaded bore receives the drive pin.

Additional features of the invention will become apparent and a fuller understanding obtained by reading the following detailed description made in connection with the accompanying drawings.

BEST MODE FOR CARRYING OUT THE INVENTION

Figure 1:
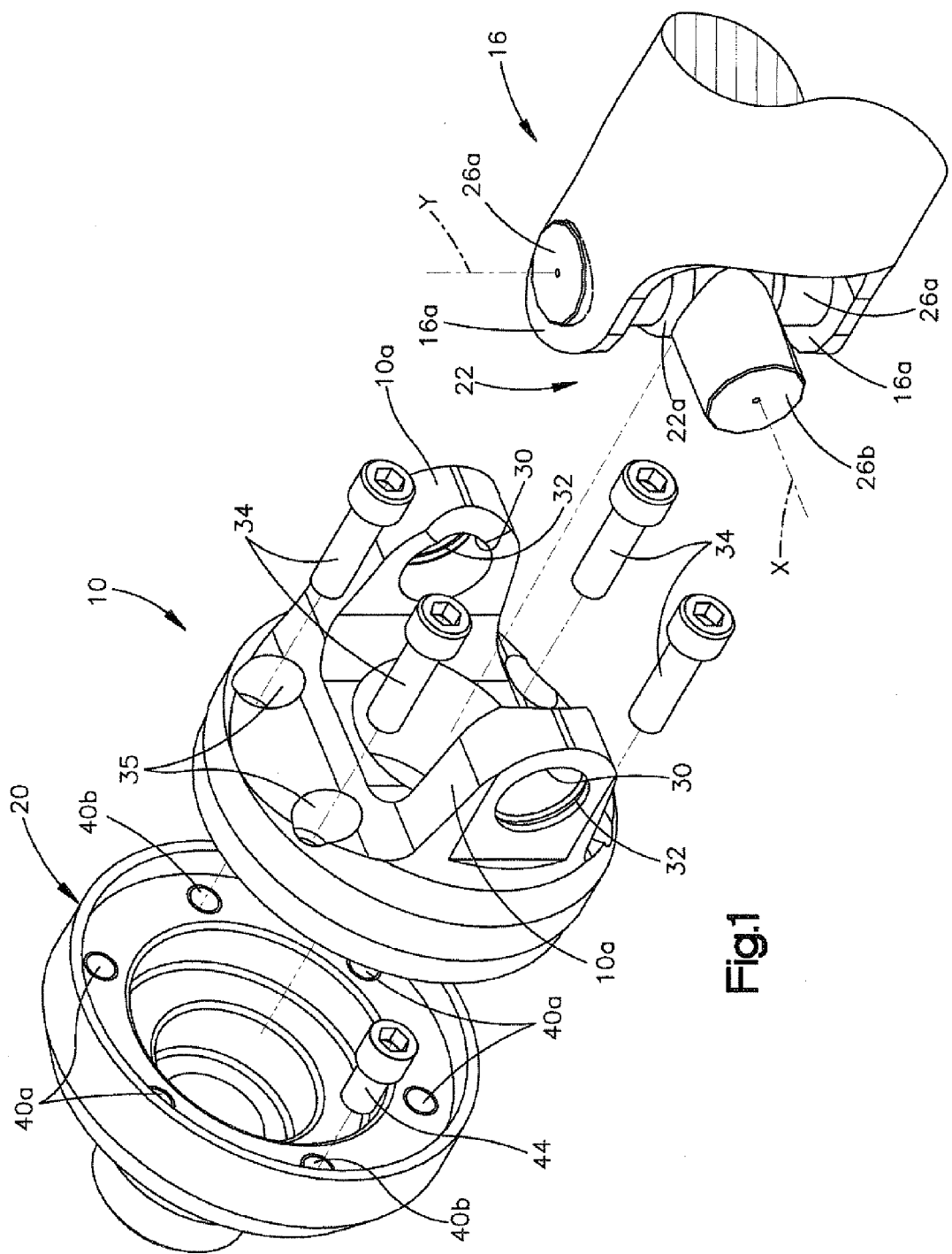
FIG. 1 is an exploded view of an apparatus constructed in accordance with a preferred embodiment of the invention for attaching and end of the drive shaft to a power train drive flange.
Figure 1A:
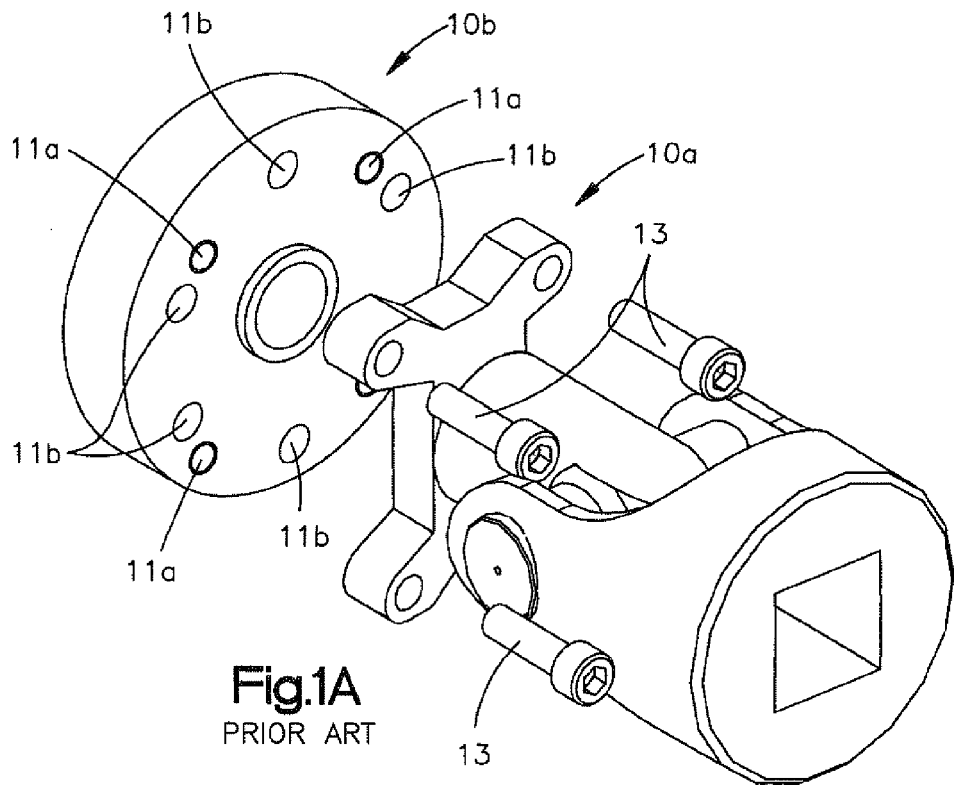
FIG. 1A is an exploded view of a prior art construction.

FIG. 1 illustrates the overall construction of a yoke member 10 constructed in accordance with a preferred embodiment of the invention, which is operative to couple a drive shaft end indicated generally by the reference character 16 to a drive flange 20. FIG. 1A illustrates an example of a prior art construction. In the prior art construction, a conventional four (4) bolt spicer-type flange yoke 10a is bolted to a "pancake" adaptor 10b. The adaptor 10b includes four (4) threaded bores 11a for receiving four (4) bolts 13 that secure the flange yoke 10a to the adaptor 10b. The adaptor includes six (6) bores 11b that receive bolts (not shown) for securing the adaptor to the OEM six (6) bolt drive flange 20 that is shown in FIG. 1. To facilitate the description, the present invention will be described as it would be used to couple an output end of a drive shaft to a flange that is coupled to and drives a pinion shaft forming part of a rear axle (not shown).

As seen in FIG. 1, the drive shaft end 16 includes a conventional spicer-type universal joint 22 which, as is conventional, comprises a cross piece 22a having two (2) pairs of journals that carry associated bearing caps 26a, 26b. One pair of bearing caps, i.e., 26a are carried by associated ears 16a of the drive shaft 16. The bearing caps 26a and associated journals define a pivot axis "x" about which the cross piece 22a pivots relative to the end of the drive shaft 16.

The yoke member 10 of the present invention includes a pair of bearing receiving ears 10a defining bores 30, which receive bearing caps 26b carried by the other pair of journals that form part of the cross piece 22a. The bearing caps 26b and associated journals define a pivot axis "y". Although not shown in detail, the engagement of the bearing caps 26a, 26b with the drive shaft ears 16a and yoke ears 10a, respectively is conventional. The caps are generally press-fitted into bores of the associated ears and may be retained by snap rings that are received by snap ring grooves 32 formed in the drive shaft ears 16a and the yoke ears 10a.

Figure 2:
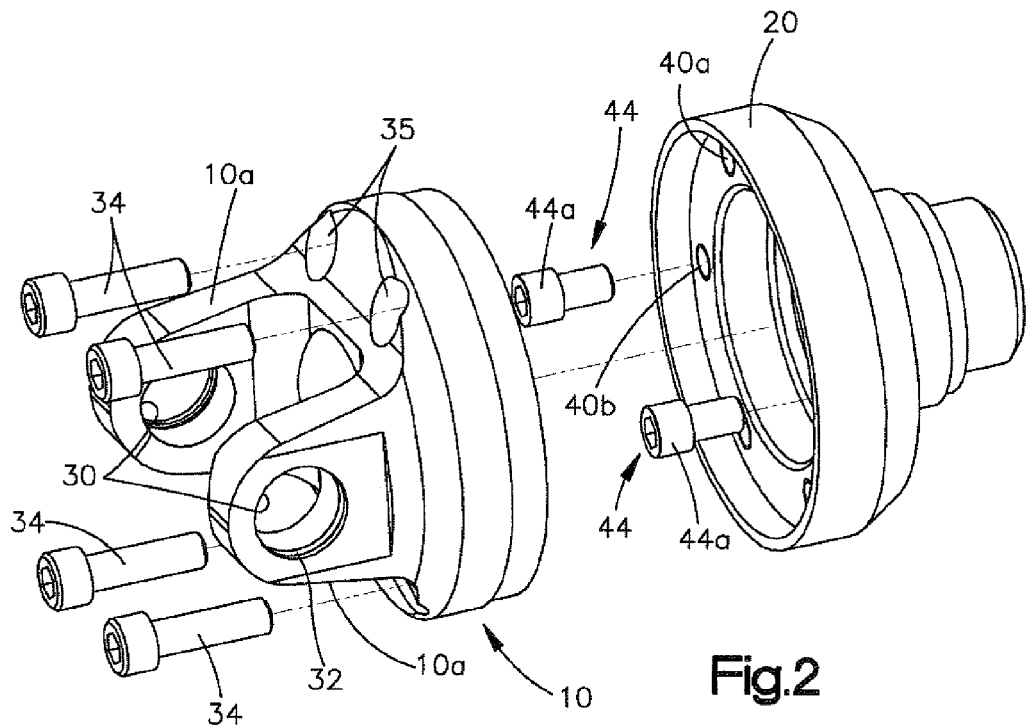
FIG. 2 is an exploded view showing a yoke member constructed in accordance with a preferred embodiment of the invention and a drive flange to which it is attached.

Referring also to FIG. 2, the yoke member 10 is secured to the drive flange 20 by four threaded fasteners 34 (which may comprise socket head bolts). The bolts 34 pass through associated bores 35 machined in the yoke member 10 and are received in four threaded bores 40a defined by the drive flange 20. The drive flange 20 is typically an OEM part supplied by the manufacturer of the automobile and includes six equally-spaced threaded bores. As designed by the manufacturer, these bores are intended to receive threaded fasteners that secure a fixed end of a drive shaft component so that the drive shaft is rigidly attached to the drive flange 20. In the OEM construction, the drive end of the drive shaft does not include a universal joint and is, therefore, rigidly attached to the drive flange.

Figure 3:
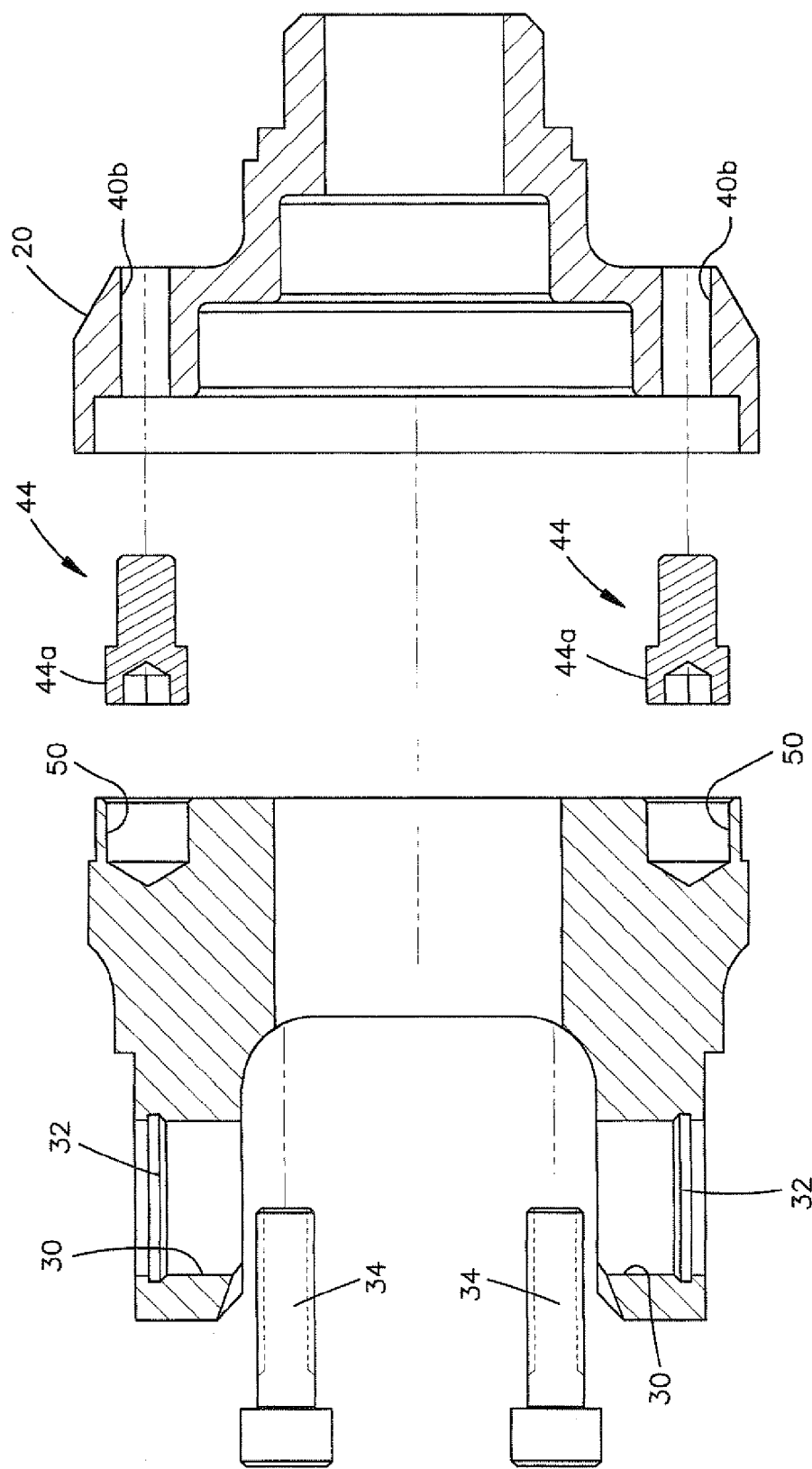
FIG. 3 is an exploded sectional view of yoke member shown in FIG. 2.
Figure 4:
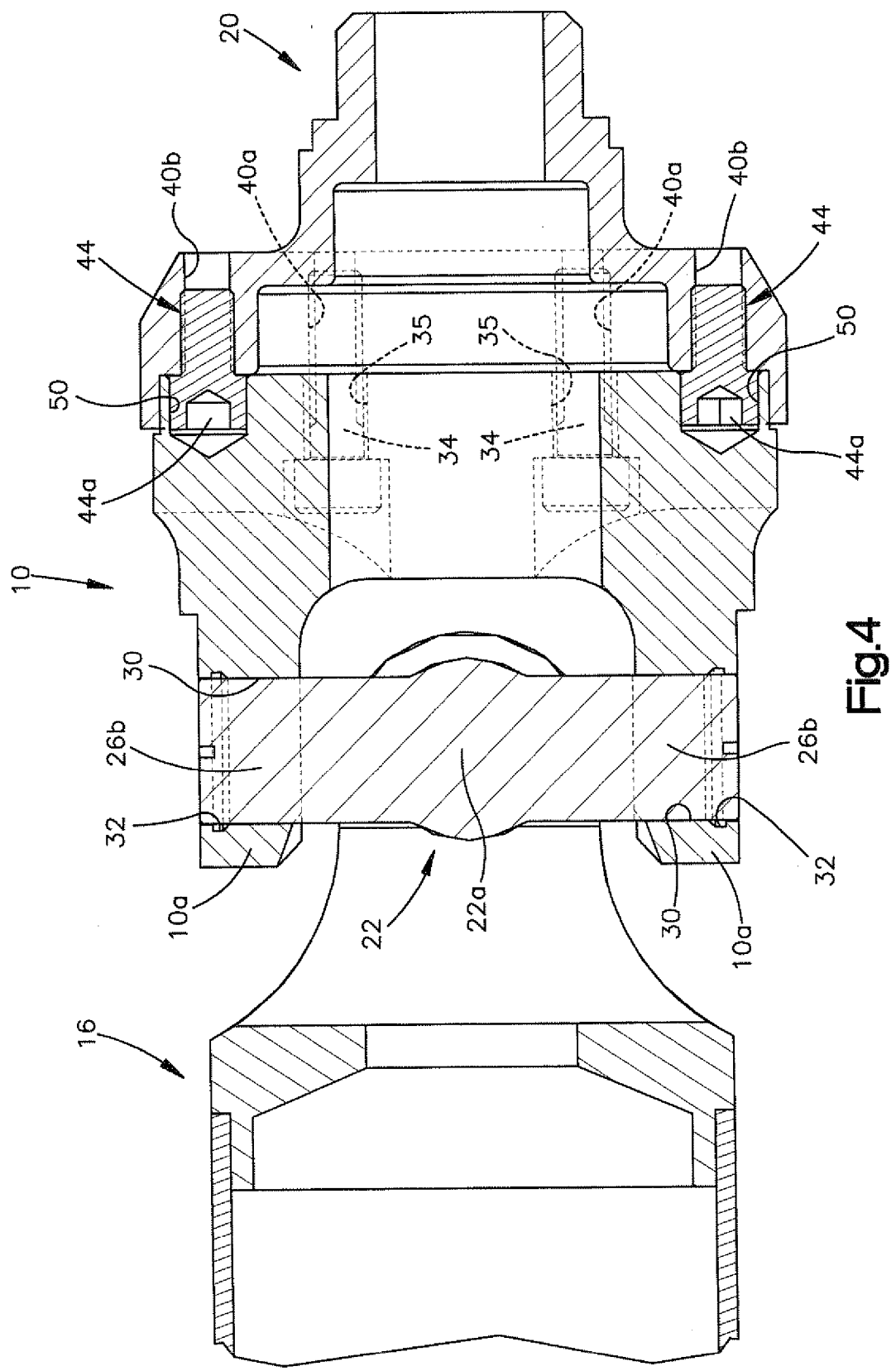
FIG. 4 is a sectional view of the overall drive shaft/driven flange coupling.

As should be apparent, coupling the yoke member 10 of the present invention to the drive flange with only four threaded fasteners may reduce the torque carrying capacity of the connection. Referring also to FIGS. 3 and 4, the torque carrying capacity of the coupling is increased by the use of torque transmitting pins 44 are threadedly received by two of the six threaded bores machined in the drive flange 20. These bores are designated by the reference character 40b are bores that do not receive the coupling bolts 34. As seen best in FIG. 3, heads 44a of the torque pins 44 are received in blind bores 50 machined into the yoke member 10. In the preferred embodiment, the torque transmitting pins 44 are precision machined socket head bolts, which are threadedly received in the bores 40b of the flange 20. The heads 44a of the torque transmitting pins 44 and the associated bores 50 preferably sized so that a precise fit between the heads 44a and bores 50 is achieved with little or no clearance, thereby enabling the pins 44 to transmit torque between the yoke member 10 and the drive flange 20, just as the coupling bolts 34 transmit torque between the yoke member 10 and the drive flange 20. As a consequence, torque is transmitted from the yoke member 10 to the drive flange 20 by six rather than four threaded fasteners, thereby substantially increasing the torque transmitting capability of the coupling.

The invention, however, does contemplate the use of conventional, off-the-shelf fasteners including standard socket head bolts as the torque transmitting pins/members 44. The invention should not be limited to the disclosed socket head bolts that are machined to precisely fit within the bores 50.

With the present invention, a conventional high strength drive shaft can easily replace the two-piece drive shaft used in vehicles such as the current Ford Mustang without sacrificing the amount of torque that can be carried by the coupling between the drive shaft and the drive flange and without the need of a separate adaptor. In the preferred embodiment, replacement of the OEM supplied two-piece drive shaft with a higher-strength and lighter single piece drive shaft can be easily accomplished by both a professional mechanic and the car hobbyist.

Although the invention has been described with a certain degree of particularity, it should be understood that those skilled in the art can make various changes to it without departing from the spirit or scope of the invention as hereinafter claimed.

The invention claimed is:

1. Apparatus for connecting a drive shaft end to a rotatable vehicle drive flange, the flange having six equally spaced, axially directed, same sized, threaded bores, the apparatus comprising:
    a) a yoke member defining a pair of ears for receiving axially aligned pin members defined by said drive shaft end;
    b) said yoke member having at least four spaced-apart, axial through bores, said at least four through bores being alignable with four of said threaded bores defined by said drive flange, said at least four through bores receiving fasteners which extend through said through bores and into said four threaded bores of said drive flange, said fasteners exerting a clamping force for securing said yoke member to said drive flange;
    c) at least one drive pin having a threaded portion threadedly received by one of said drive flange threaded bores, said fasteners and said threaded portion of said drive pin having the same thread pattern;
    d) said at least one drive pin having an unthreaded, expanded head portion which extends in an axial direction beyond its associated drive flange bore and said yoke member defining a substantially blind torque transfer bore slidably receiving said head portion of said drive pin in a torque transmitting relationship such that said at least one drive pin transfers torque between said drive flange and said yoke member in either direction of rotation of said yoke member.

2. The apparatus of claim 1 wherein said drive pin head portion and said associated torque transfer bore are sized such that said drive pin head portion is received by said bore in a slidable tight-fitting relationship.

3. The apparatus of claim 1 further including an additional drive pin threadedly received by another drive flange threaded bore in said drive flange and said yoke member includes an additional torque transfer bore for slidably receiving a portion of said additional drive pin which extends in an axial direction beyond its associated drive flange bore.

4. The apparatus of claim 1 wherein said yoke member forms part of a universal joint for attaching said drive shaft end to said drive flange.

5. The apparatus of claim 1 wherein said pin members form part of a cross piece which defines two orthogonal pivot axes for attaching said drive shaft end to said yoke member.

6. A method for attaching a drive shaft to a rotatable vehicle drive flange, the drive flange having six equally spaced, axially directed, same sized threaded bores, the method comprising the steps of:
   a) forming a yoke member defining a pair of ears for slidably receiving axially aligned pin members defined by the drive shaft and forming at least four spaced apart axial through bores in said yoke member which are alignable with four of said threaded drive flange bores;
   b) attaching said yoke member to said drive flange using fasteners that extend through said axial through bores and threadedly engage four of said threaded drive flange bores, said fasteners exerting a clamping force for securing said yoke to said drive flange;
   c) installing a threaded portion of a drive pin into a drive flange bore that is not aligned with said axial through bores of said yoke member; and,
   d) forming a substantially blind bore in said yoke member for slidably receiving an unthreaded, expanded head portion of said drive pin in a torque transmitting relationship by which torque is transmitted between said drive flange and said yoke member in either direction of rotation of said yoke member.

7. The method of claim 6 further comprising the step of installing an additional drive pin in another one of said drive flange threaded bores and allowing a head portion of said another drive pin to slidably extend into a torque transmitting relationship with an associated bore formed in said yoke member.

8. The method of claim 6 further comprising the step of sizing said drive pin and/or said associated yoke member bore such that a slidable tight fitting relationship is created between said drive pin and associated yoke member bore.

* * * * *